(12) United States Patent
Clark

(10) Patent No.: US 9,445,686 B2
(45) Date of Patent: Sep. 20, 2016

(54) LIQUID BEVERAGE DISPENSER

(71) Applicant: BUNN-O-MATIC CORPORATION, Springfield, IL (US)

(72) Inventor: Charles H. Clark, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 498 days.

(21) Appl. No.: 13/679,712

(22) Filed: Nov. 16, 2012

(65) Prior Publication Data

US 2013/0171311 A1    Jul. 4, 2013

Related U.S. Application Data

(60) Provisional application No. 61/560,516, filed on Nov. 16, 2011.

(51) Int. Cl.
*A47J 31/40* (2006.01)

(52) U.S. Cl.
CPC .................. *A47J 31/407* (2013.01)

(58) Field of Classification Search
CPC .... A47J 31/46; A47J 31/407; A47J 31/0668; A47J 31/36; A47J 31/56; A47J 31/3623; A47J 31/3676; A47J 31/057; A47J 31/3695; A47J 31/54; A47J 31/4407; A47J 31/368; A23F 3/18; A23F 5/262
See application file for complete search history.

(56) References Cited

U.S. PATENT DOCUMENTS

| | | |
|---|---|---|
| 2,254,833 A | 9/1941 | Ashkenaz |
| 2,887,255 A | 5/1959 | Bauerlein |
| 3,358,166 A | 12/1967 | Nolan |
| 3,641,918 A | 2/1972 | Schellgell et al. |
| 4,378,079 A | 3/1983 | Kuckens |
| 4,393,982 A | 7/1983 | Kuckens |
| 4,450,987 A | 5/1984 | Boettcher et al. |
| 4,581,105 A | 4/1986 | Chao et al. |
| 5,197,374 A | 3/1993 | Fond |
| 5,398,595 A | 3/1995 | Fond et al. |
| 5,740,719 A | 4/1998 | Triola et al. |
| 5,958,478 A | 9/1999 | Lehrer |
| 5,961,009 A | 10/1999 | Rekers |
| 6,079,315 A | 6/2000 | Beaulieu et al. |
| 6,447,830 B1 | 9/2002 | Cevallos et al. |

(Continued)

OTHER PUBLICATIONS

Sandford, "Single-Cup Pioneer Cy Melikian Recalls Genesis of Espresso 'Pod' as ABCD Gears Up to Meet Growing OCS Specialty Coffee Demand," *Vending Times*, 41:11 (2001); accessed online at: http://www.vendingtimes.com/ME2/dirmod.asp?sid=EB79A487112B48A296B38C81345C8C7F.

*Primary Examiner* — Lien T Tran
*Assistant Examiner* — Hong T Yoo
(74) *Attorney, Agent, or Firm* — Barnes & Thornburg LLP

(57) ABSTRACT

A beverage dispenser and methods of use for combining at least one beverage ingredient with a diluting ingredient to form a beverage. In one embodiment, the beverage ingredient is coffee or tea and the diluting ingredient is water. The beverage ingredient is retained in a container which is positioned in the beverage dispenser. The ingredient is mixed with water at least in part in the container for dispensing into a receptacle positioned relative to the dispenser. In one embodiment, the beverage ingredient is a liquid form of beverage concentrate packaged in a disposable container. The beverage dispenser includes mechanisms and assemblies which form a single opening in the container to allow water to enter and exit the container through the single opening in the container to release and mix the beverage ingredient.

9 Claims, 9 Drawing Sheets

(56) References Cited

U.S. PATENT DOCUMENTS

| | | |
|---|---|---|
| 6,805,041 B2 | 10/2004 | Colston et al. |
| 6,871,679 B2 | 3/2005 | Last |
| 7,578,419 B2 | 8/2009 | Greenwald et al. |
| 7,592,027 B2 | 9/2009 | Halliday et al. |
| 7,594,525 B2 | 9/2009 | Girard et al. |
| 7,640,843 B2 | 1/2010 | Halliday et al. |
| 7,651,015 B2 | 1/2010 | Girard et al. |
| 7,654,191 B2 | 2/2010 | Greenwald et al. |
| 7,677,158 B2 | 3/2010 | McDuffie et al. |
| 7,798,055 B2 | 9/2010 | Mandralis et al. |
| 7,861,646 B2 | 1/2011 | Bockbrader |
| 8,210,396 B2 | 7/2012 | Girard et al. |
| 2003/0066431 A1* | 4/2003 | Fanzutti et al. ............ 99/279 |
| 2006/0000851 A1 | 1/2006 | Girard et al. |
| 2006/0112831 A1 | 6/2006 | Greenwald et al. |
| 2008/0029541 A1 | 2/2008 | Wallace et al. |
| 2008/0148959 A1 | 6/2008 | Bockbrader |
| 2008/0210098 A1 | 9/2008 | Weijers et al. |
| 2010/0068354 A1 | 3/2010 | Roberson et al. |
| 2010/0170402 A1 | 7/2010 | Kirschner |
| 2011/0168029 A1 | 7/2011 | Fulco |
| 2011/0265658 A1 | 11/2011 | Talon et al. |
| 2012/0060698 A1 | 3/2012 | Baldo et al. |

* cited by examiner

LIQUID BEVERAGE DISPENSER

CROSS REFERENCE TO RELATED APPLICATIONS

This application claims the benefit of priority under 35 U.S.C. §119(e) to U.S. Provisional Patent Application No. 61/560,516, filed Nov. 16, 2011. The disclosure set forth in the referenced application is incorporated herein by reference in its entirety.

BACKGROUND

The present disclosure relates a beverage dispenser and methods of use for combining at least one beverage ingredient with a diluting ingredient to form a beverage. In one embodiment, the beverage ingredient is coffee or tea and the diluting ingredient is water. The beverage ingredient is retained in a container which is positioned in the beverage dispenser. The ingredient is mixed with water at least in part in the container for dispensing into a receptacle positioned relative to the dispenser. In one embodiment, the beverage ingredient is a liquid form of beverage concentrate packaged in a disposable container. The beverage dispenser includes mechanisms and assemblies which form a single opening in the container to allow water to enter and exit the container through the single opening in the container to release and mix the beverage ingredient.

By way of background, a variety of dispensing apparatus have been developed which include brewers, and dispensers which use a variety of beverage ingredients including powder, soluable coffee material, fresh ground coffee material, and other forms of beverage material. These systems are designed to pass the dilution or brewing ingredient such as water through a predetermined volume of beverage ingredient to brew or mix and produce a resultant liquid beverage. If the beverage ingredient is retained in the container such as a pod, cartridge, or other container one end of the container is opened so is to allow the water to flow into the container and the second end of the container is opened to allow water and beverage or beverage to flow out of the container into the cup or other receiving receptacle. In this "pass through" type of system two openings may formed in the container, usually by puncturing, such as with generally impermeable cartridges; or the water flows through a permeable material, such as with pods.

If two openings are formed in the container removal of the container from the apparatus can result in dripping of residual fluid in the container. Such residual material might drip out of the container onto the user, the user's clothing or the surrounding surfaces. The use of a pass through or dual puncture system can result in such dripping.

It would be preferable to provide a system in which the user can remove the container from the beverage dispenser with the knowledge that the ingredient has been exhausted and/or rinsed from the container. Also, use of a single opening in the container will allow the user to orient the container after use with the opening in a direction to prevent dripping from the container.

It would be preferable to provide a single uniform system and container format that can be used with a wide variety of beverage ingredients. Prior art systems tend to be limited to one type of beverage ingredient for the format, primarily a brewable beverage contained in a permeable filter within a generally impermeable container.

This background information is provided to provide some information believed by the applicant to be of possible relevance to the present disclosure. This information is not intended to be an admission and no such admission should be inferred or construed. This information is not intended to limit the invention and/or the claims as disclosed herein and such limitation should not be inferred or construed. The preceding information shall not constitute prior art against the present invention. Other aims, objects, advantages and features of the invention will become more apparent upon reading of the following non-restrictive disclosure of specific and broadening embodiments thereof, given by way of example only with reference to the accompanying drawings.

BRIEF DESCRIPTION OF THE DRAWINGS

The present disclosure will be described hereafter with reference to the attached drawings which are given as a non-limiting example only, in which.

Figure 1:
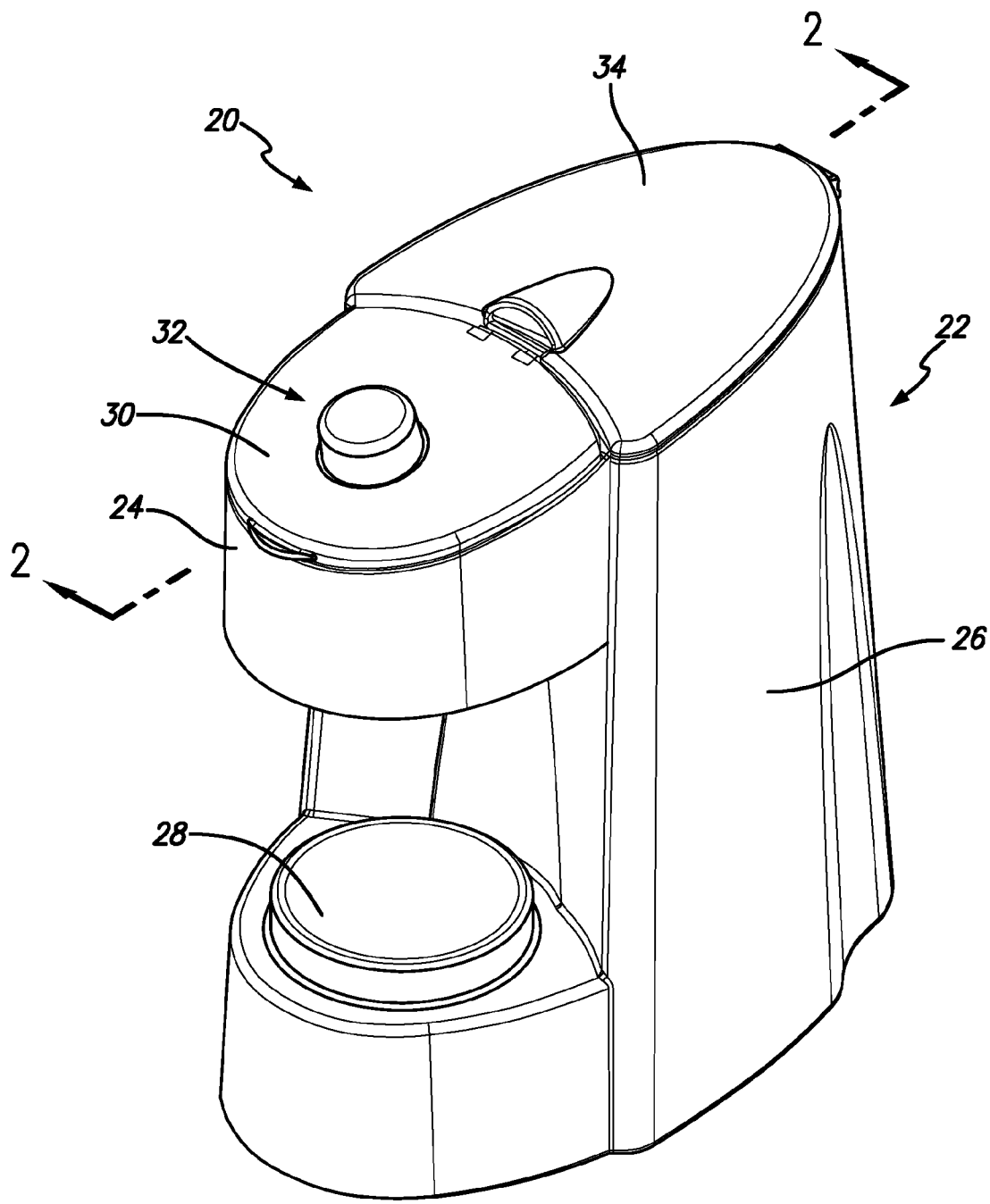
FIG. 1 is a front right side perspective view of a beverage dispensing apparatus of the present disclosure, the dispensing apparatus includes a housing containing a variety of mechanisms and assemblies to facilitate the dispensing of a beverage, the housing includes a hood or shroud portion extending away from a main body and a extending over a cup platform, a lid is provided on the hood for displacement and use in placing a container containing a beverage ingredient in the apparatus, a cover is provided over a water reservoir to facilitate displacing of the cover and pouring of water into the reservoir and replacing the cover to close the reservoir.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying at least one best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

As shown in FIG. 1, a dispensing apparatus 20 is shown which includes a housing 22 having a hood or shroud 24 extending from a main body 26 thereof. A cup platform 28 extends from the main body generally aligned with the hood 24. A cup 92 (see FIG. 2) is positioned on the cup platform 28 with the open end of the cup positioned below the hood 24. As described in greater detail below, assemblies and mechanisms in the apparatus 20 dispense a beverage from the hood portion 24 into the cup.

Figure 2:
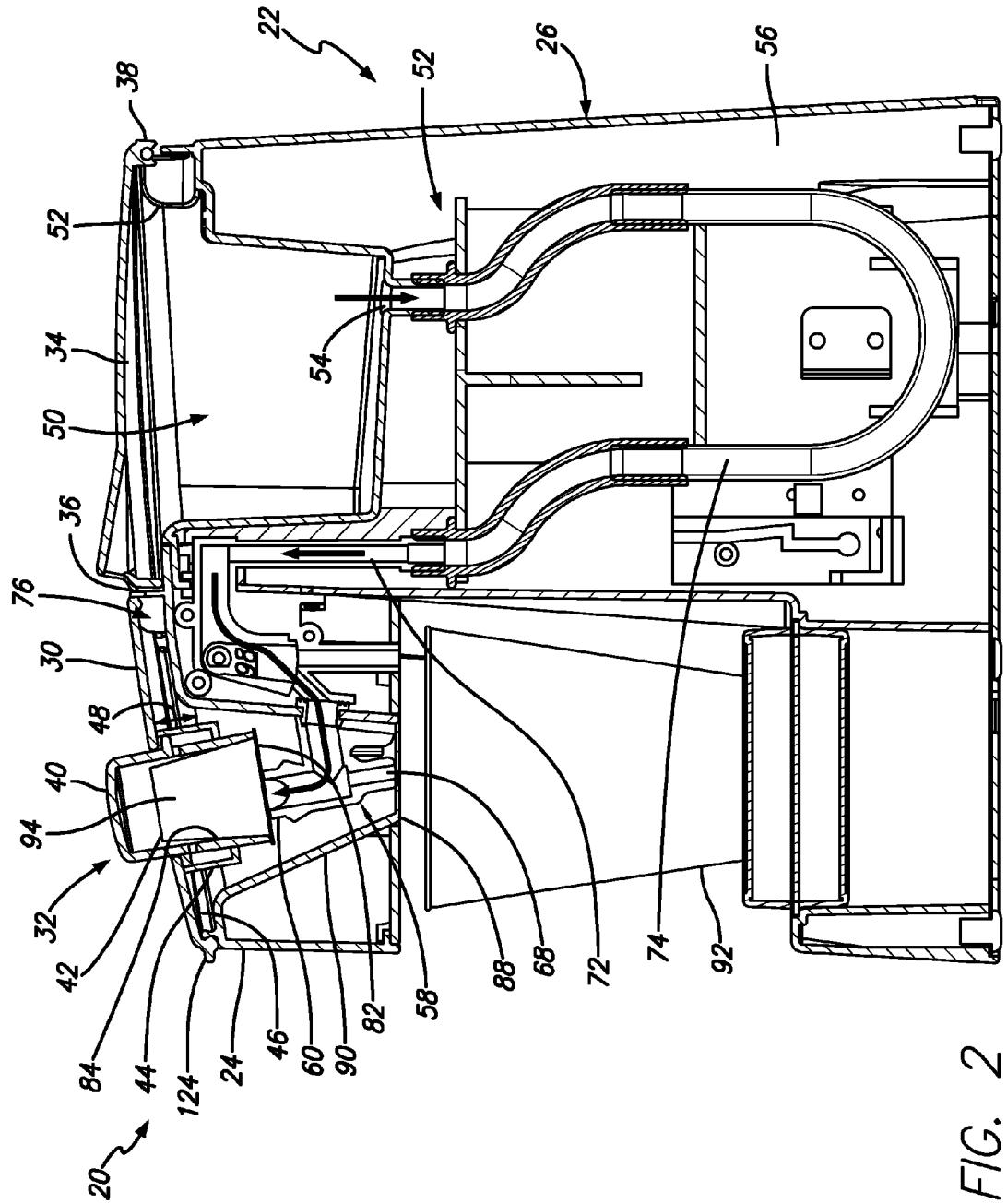
FIG. 2 is a cross sectional side elevational view taking along line 2-2 in FIG. 1 and showing at least portions of a water delivery system in the dispensing apparatus, the lid includes a container holder assembly which positions a container proximate to an outlet end of the water delivery system, a diverter assembly is shown between a reservoir and the outlet end of the water delivery system.

With further reference to FIG. 2, a lid 30 is positioned over the hood 24. The lid includes a container holder assembly 32 which will be described in greater detail below. A cover 34 is positioned over a reservoir 50 and is displaceable to allow user to pour water into the reservoir 50.

With reference to FIG. 2, the lid 30 and cover 34 are both hingedly attached 36, 38 to portions of the housing 22 and main body 26. The container holder assembly 32 includes a holder portion 40 which is sized and dimensioned to receive a container 42 therein. Generally, the container is retained in the holder 40 in a slight friction fit or by use of some form of retaining structure 44. A retainer 44 extends from an inside surface 46 of the lid 30 to retain the holder 40 therein that allow a degree of travel 48 relative to the lid 30. The purpose of this travel will be described in greater detail below.

The cover 34 extends over the reservoir 50 having a mouth 52 for dispensing water into the reservoir 50 when the cover 34 is displaced relative to the main body 26. The reservoir 50 is part of a water delivery system 52 which receives water from an inlet 54 in the reservoir 50, heats water through a heating system 56 and dispenses it through an outlet end 58.

Figure 3:
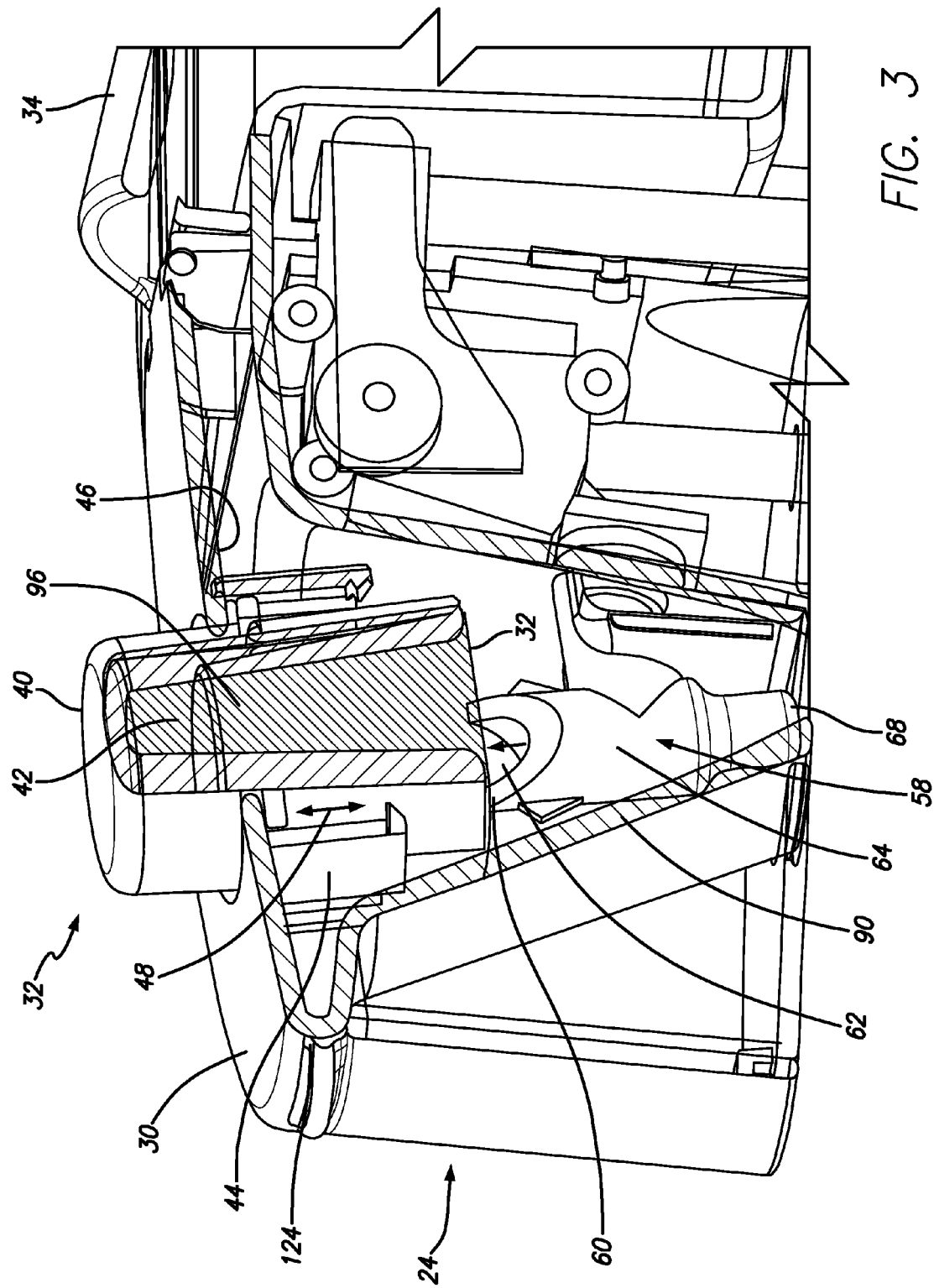
FIG. 3 is an enlarged, partial perspective, partial fragmentary view of the container holder assembly with a container retained therein in position proximate to the outlet end of the water delivery system for use in the beverage dispensing process, an opening device is provided at the outlet end of the water delivery system to facilitate a user's selective operation and opening of the container to dispense a beverage.

The outlet end 58 includes an opening device 60 which is used to make an opening in the container 42. As shown, in FIGS. 2-4, the opening device 60 includes a passage 62 extending through a fitting body 64. The fitting body 64 includes a beveled end 66 at one end of the passage 62 and a port 68 communicating with the passage 62.

Generally, in use, a user places water into the reservoir 50 which is heated by the heating system 56. The user also places a container 42 in the container holder assembly 32. The system will not dispense a beverage until a control assembly 70 (see FIG. 5) is actuated. Details of the control assembly 70 will be described in greater detail below. Once the control assembly 70 is actuated the heating system 56 will initiate heating of water. Unheated water is delivered from the inlet 54 of the reservoir 50 and passes through the heating system heating element 72. Heated water is advanced through a dispensing tube 74 and through a diverter assembly 76. The diverter assembly 76 will be described in greater detail below.

The user actuates the container holder assembly 32 by pressing down on the protruding portion 80 of the container holder assembly 32. Pushing down on the protruding portion 80 causes the holder 40 to shift or travel 48 relative to the retainer 44. The container 42 carried in the holder 40 is driven towards the opening device 60. An end 82 of the container 42 is pressed against the opening device 60 causing at least a portion of the opening device 60 such as the leading end or beveled end 66 to open or penetrate the end 82 of the container 42. Penetration of the opening device 60 through the end 82 allows water to be flushed from the outlet end 58 into a cavity 84 of the container 42. Water dispense through the water delivery system 52 flows from the outlet end 58 into the cavity 84 and out through the opening form by the opening device 60. Beverage flowing out through the opening device 60 flows through an aperture 88 of a funnel structure 90 also retained in the hood portion 24. Beverage flowing through the aperture 88 is dispensed into their cup 92 there below.

Broadly, the present disclosure is directed to an apparatus 20 which receives a container 42 for mixing with water during a beverage dispensing cycle. Water is placed in the apparatus 20 or otherwise delivered to the apparatus for mixing with at least one beverage ingredient 94 retained within a cavity 84 of the container 42. The apparatus, system and method employ an opening device 60 which penetrates an end, wall or other portion 82 of the container 42 to form a single opening in the container. Water is moved into the cavity through the single opening and mixes with the ingredient 94 in the container for flushing out through the same opening. The combined water and ingredient mixture is dispensed from the container 42 and dispensed to a cup 92. It should be appreciated that a variety of structures, assemblies and systems can be used to achieve the apparatus, method, and system of the present disclosure. All of the descriptions provided herein should be broadly construed and interpreted to provide the broadest possible coverage.

The diluting ingredient is described in the present disclosure as being water. However, it should be appreciated that a variety of diluting ingredients could be used such as milk, juice, carbonated water, tea, coffee, as well as, other ingredients. Generally, the diluting ingredient will be in the form of a liquid although a wide range of various viscosities of liquid are included in the present description.

Similarly, while the beverage ingredient described herein is referred to as "coffee" for the convenience of description, this term should be broadly interpreted to include coffee, tea, juice concentrates, dairy based ingredients, flavorings, syrups, gel, crystals, powder, and any other food ingredient which presently can be or are hereafter adapted, designed, or otherwise provided to be used in the present system. Furthermore, the ingredient may be in any variety of forms including liquid, gel, powder, frozen, freeze-dried, or any other form of ingredient which might be used in a beverage dispensing process.

The container 42 as generally described is envisioned to be a container having a body or wall 94 defining the cavity 84. The end 82 might be in the form of a flexible material which is attached to one end. For purposes of description, the container can be in the form of a cup with an open mouth which is sealed at the end 82. Ingredient 94 is filled during the manufacturing process for use in the dispensing apparatus 20 before sealing the container 42. While the container 42 is as generally described, a variety of containers could be used in the present device such as other forms of capsules, pods, cartridges, spheres, cubes, tubes, sticks, and any other form of container with or without a separate sealing structure which is presently available or hereafter adapted, designed, or otherwise provided to be used in the present system. The container 42 can be formed of a variety of materials including single layer and multi layer food-grade packaging materials such as plastics, papers, metallics, mineral, ceramic, composites, and other materials and may be formed with areas which facilitate opening of the container for use during the dispensing process.

While references made to penetrating the end 82, it is envisioned that a container holder assembly 32 could be configured which does not penetrate but provides the force on the container 42 which causes the container to rupture or otherwise open, with or without cutting the material to allow water to flow into the container 42 and out through the container 42 generally through the same opening. All of the foregoing embodiments as well as any other embodiment is considered to be incorporated in the present disclosure.

The present apparatus, method and system provide a beverage dispenser which easily, efficiently and cleanly combines water and a beverage ingredient to dispense a beverage therefrom. While the water described herein is heated, it is envisioned that steamed, unheated, ambient, chilled, or at least partially frozen water, or other dilution ingredient, could be used in the present application. Moreover, the present disclosure could be used with a plumbed water system which directly connects the water dispensing system 52 to a pressurized line. In this regard, control valves and other control assemblies can be incorporated either with or without the reservoir 50. The remaining systems still provide the flow of water to a beverage ingredient container having a single opening permitting mixing and flushing of the ingredient out of the cavity 84 during the dispensing process.

Figure 4:
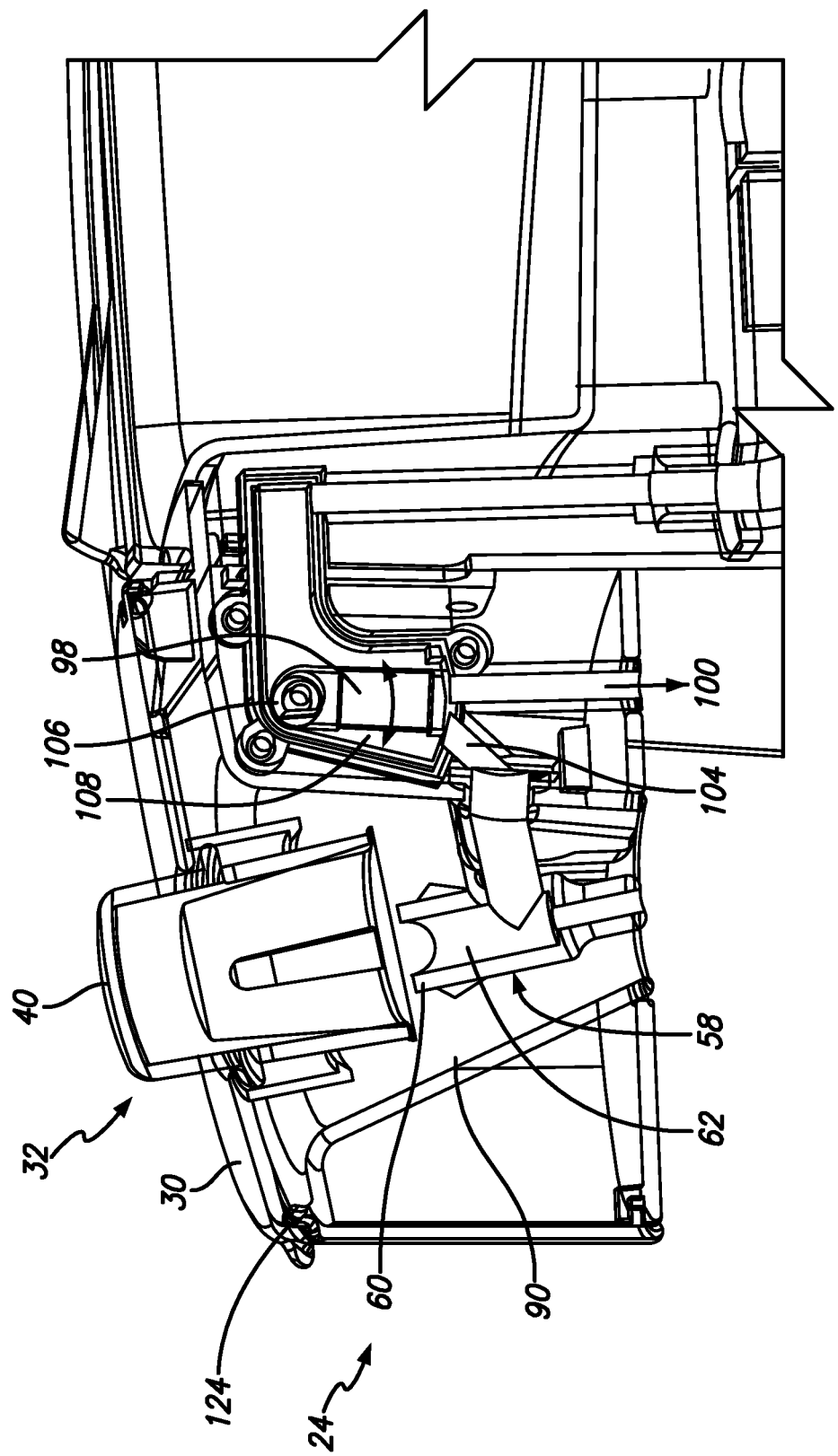
FIG. 4 is a view similar to FIG. 3 which shows a cross sectional view of the diverter assembly, the diverter assembly is described in combination with the control mechanism further shown in FIG. 5, to control and divert the flow of water through the water delivery system to the outlet end or, if the lid is open during the brewing process to divert the flow through an exit passage to stop the flow from the outlet end.

As previously introduced, a diverter assembly 76 is provided. When the lid 30 is opened the diverter assembly 76 shifts a valve 98 to direct flow from the water delivery system through an exit passage 100. As shown in FIG. 4, the valve 98 of the diverter assembly 76 includes a stopper portion 102 which is rotatably shiftable to block the exit passage 100 or the dispensing passage 104. While a valve 98 is shown having a generally linear structure attached to a keyed shaft 106 and providing clearances 108 on either side of the valve body 98, other forms of the valve are envisioned and fully incorporated in the present disclosure.

Once the beverage dispenser is activated and heated water is flowing through the dispense tube 72, it is directed through the diverter assembly 76 and out through the outlet end 58. As the user has already depressed the protruding portion 80 of the container holder assembly 32, water flows through the beveled end 68 of the opening device causing water to flow into the cavity 84. Water flowing into the cavity 84 is mixed with the beverage ingredient. While initially some water may mix with the beverage ingredient with little output, once the cavity 84 is filled with a combination of ingredient and water, flow will start. The port 68 is provided to provide some diversion of water from the dispensing passage 104. This tends to reduce some of the pressure entering the cavity 84 and also helps to produce a more consistent beverage stream in combination with the beverage flowing out of the opening and through the funnel structure 90.

Initially, the dispensing cycle starts with a flow of water combining with the ingredient. During the process, the amount of ingredient remaining in the cavity 84 is decreased. Towards the end of the dispensing cycle virtually no ingredient will be left in the cavity as it will have been flushed during the dispensing process. This results in a relatively clean, general ingredient free cavity. Also, towards the end of the dispensing cycle the relatively clean water will rinse the inside surfaces of the funnel 90 also resulting in a relatively clean interior surface and exterior surfaces of the opening device 60. As such, the dispensing apparatus is generally self cleaning and flushes ingredient from the relevant surfaces. Additionally, the opening device 60 can be constructed to couple with the dispensing passage 104 in a manner which allows it to be removable from within the funnel structure 90. This facilitates additional cleaning as needed. This opening device 60 can be configured for removal and replacement without tools by means of a press fit coupling and/or magnetic couplings. Additionally, a tether or other connector can be provided to prevent separation of the item from the apparatus.

The aperture 88 of the funnel structure 90 is sized and dimensioned to prevent the opening device from being dispensed into a cup should it not be properly mounted or otherwise attached. In a situation where the opening device 60 is not properly attached it will merely be retained in the funnel structure and not dispensed into the cup.

At the end of a dispensing cycle the lid can be displaced to allow the user to remove the container 42 from the container holder 40. Since the container 42 has been rinsed of the ingredient, the container 42 will have virtually no ingredient inside to cause stain or other messes. Additionally, since only one opening is formed in the container 42 the container 42 can be oriented with the opening facing upward or otherwise to prevent any remaining fluid, generally clear water, from dripping from the container 42. In this regard, the present dispenser eliminates the dripping which might be associated with other pass through dispensing apparatus.

Figure 5:
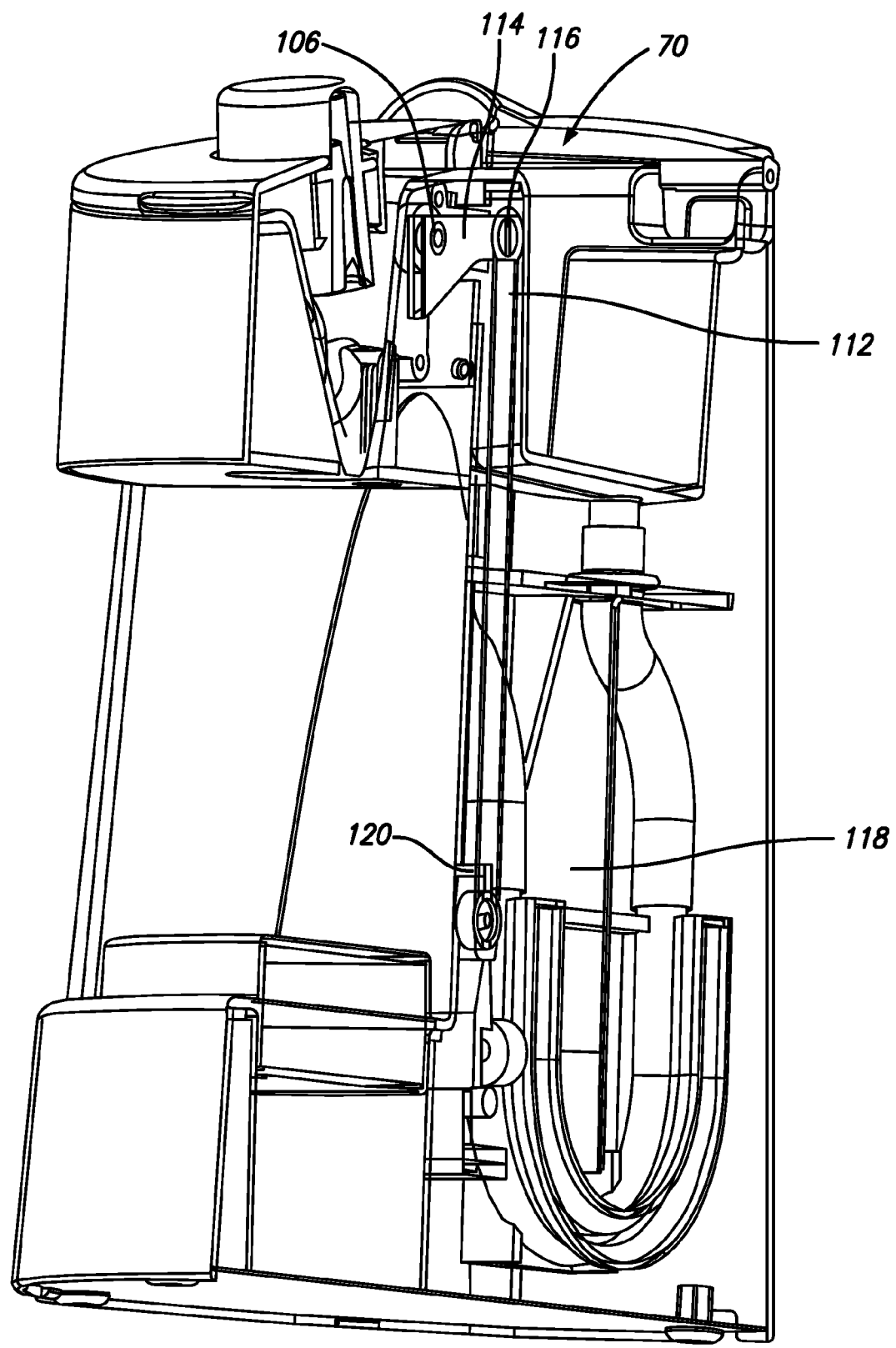
FIG. 5 shows a control assembly including a lever arm coupled to a linkage communicating through a cam assembly to a control switch, the control switch operating to energize a heater of the water delivery system to provide heated water for mixing with the container ingredients.
Figure 6:
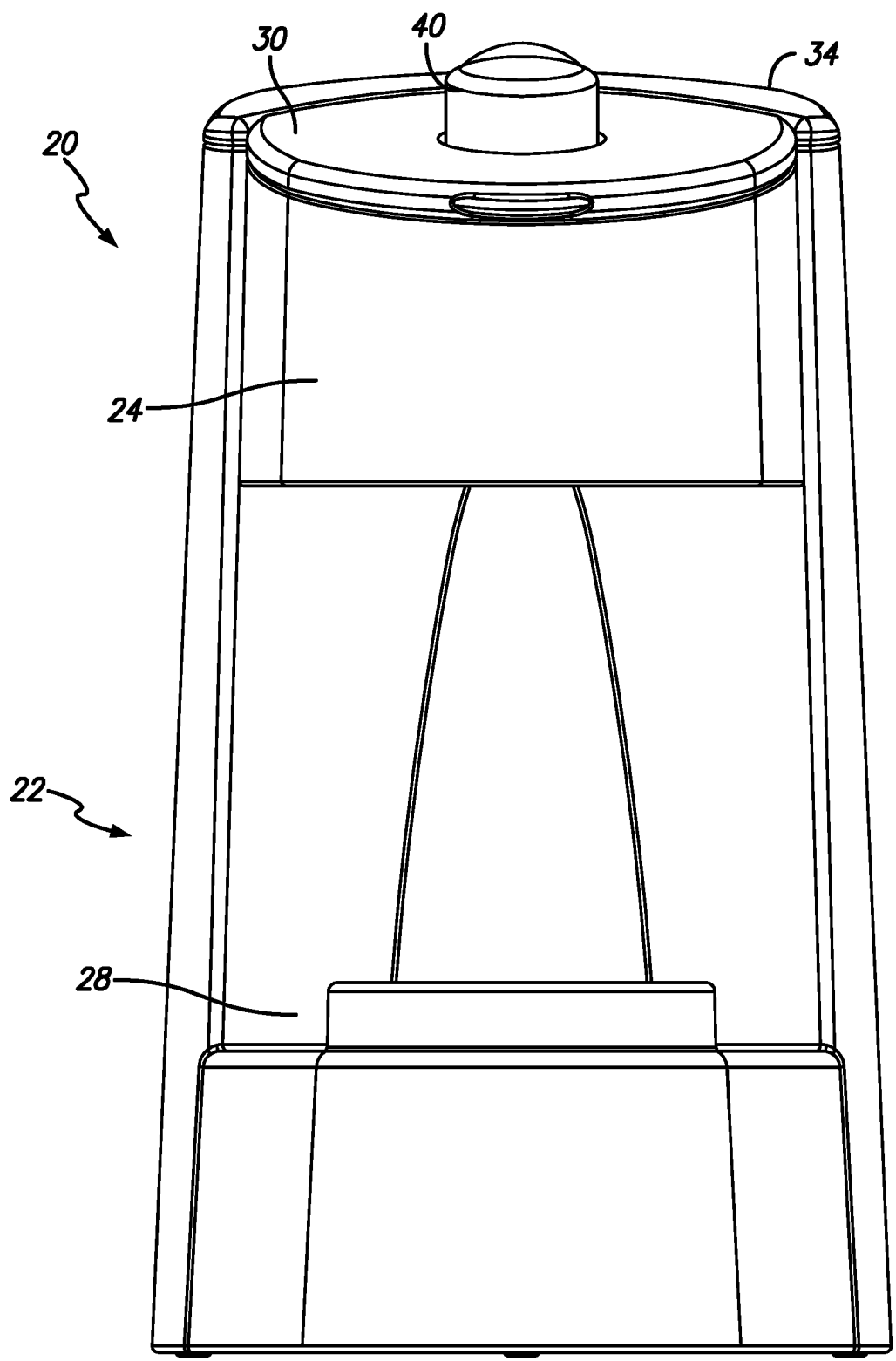
FIG. 6 is a front elevational view of the beverage dispensing apparatus shown in FIG. 1.
Figure 7:
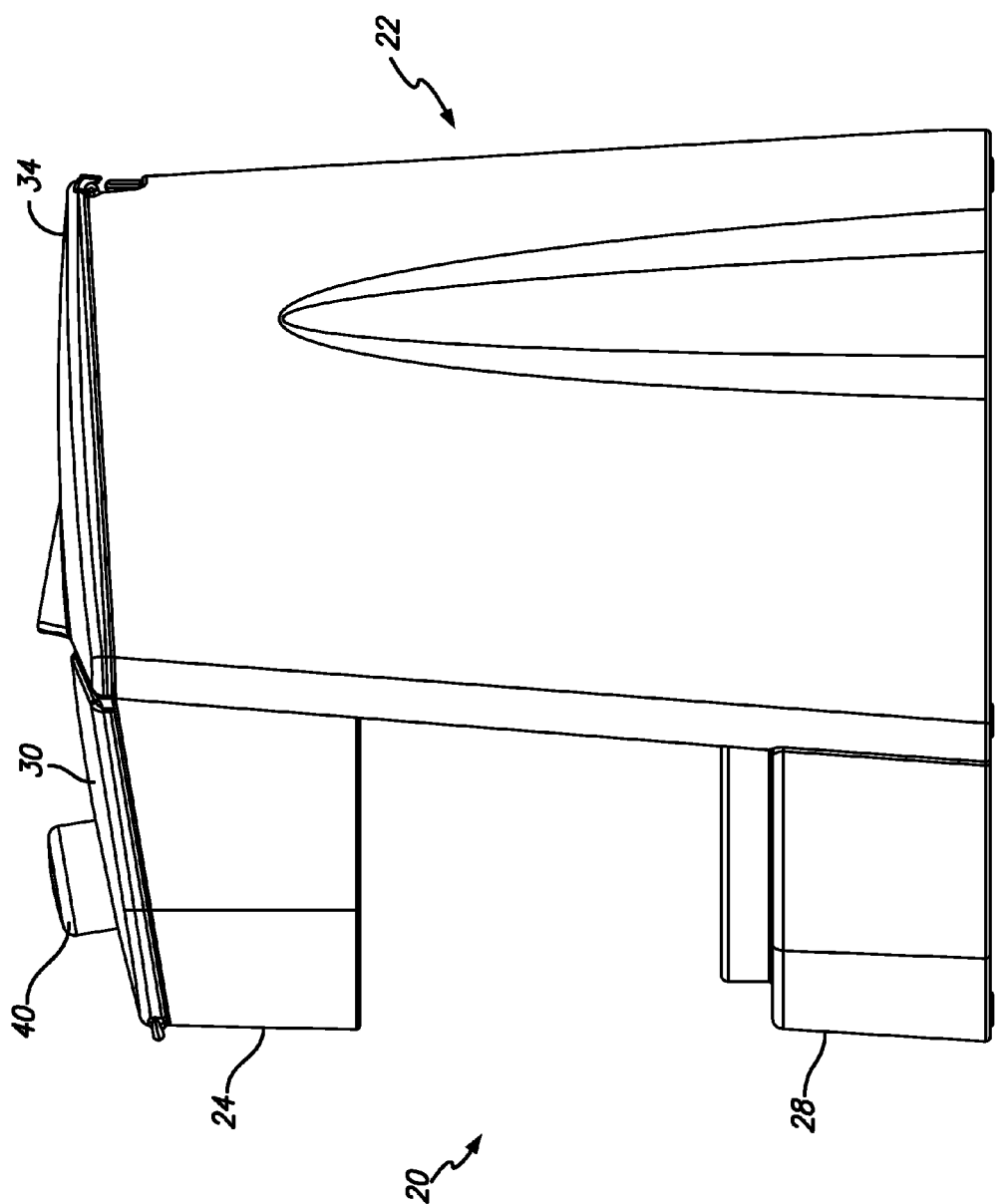
FIG. 7 is a right side elevational view of the beverage dispensing apparatus shown in FIG. 1, the left side view of the dispenser being a mere image of FIG. 7.
Figure 8:
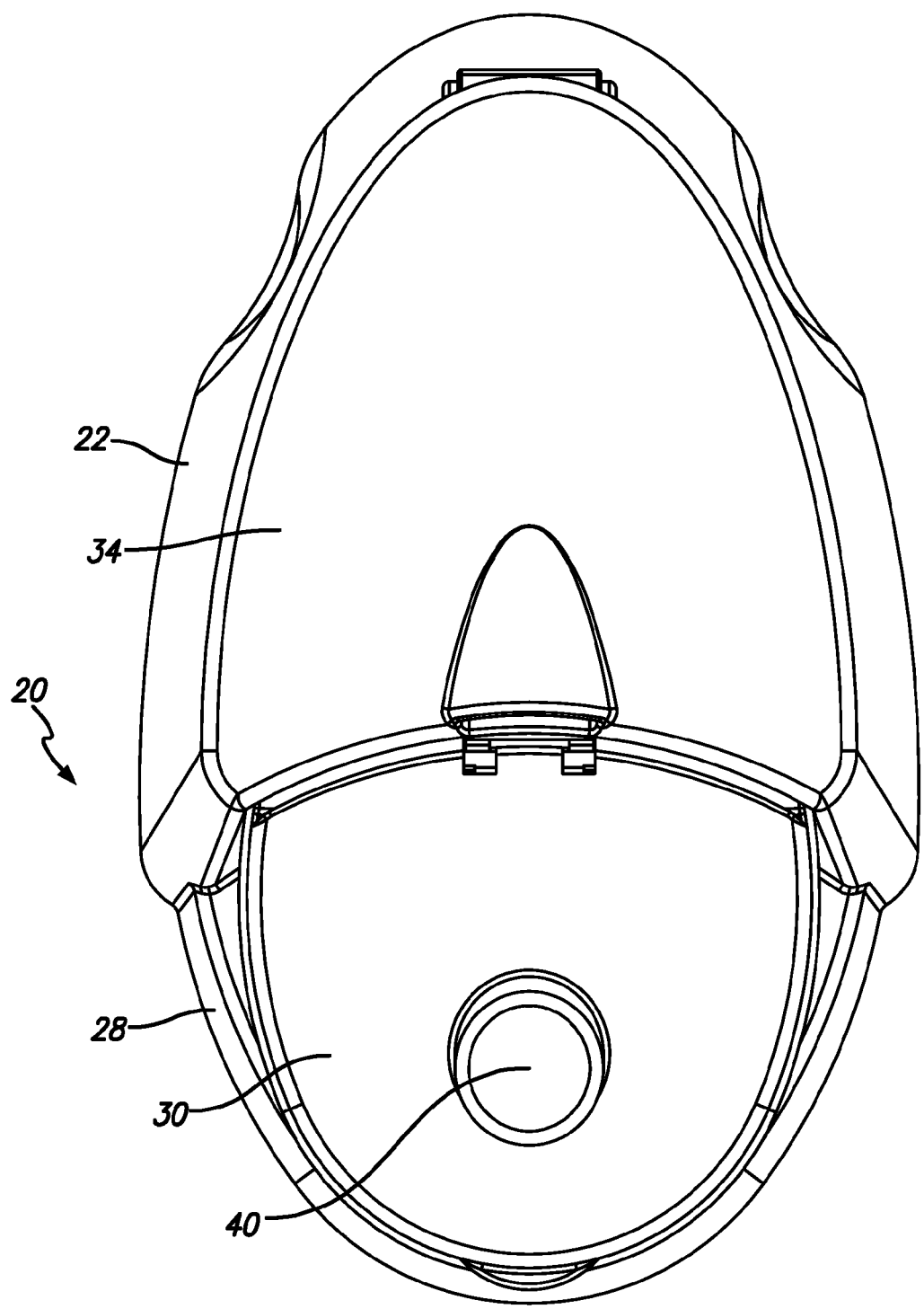
FIG. 8 is a top plan view of the beverage dispensing apparatus shown in FIG. 1.
Figure 9:
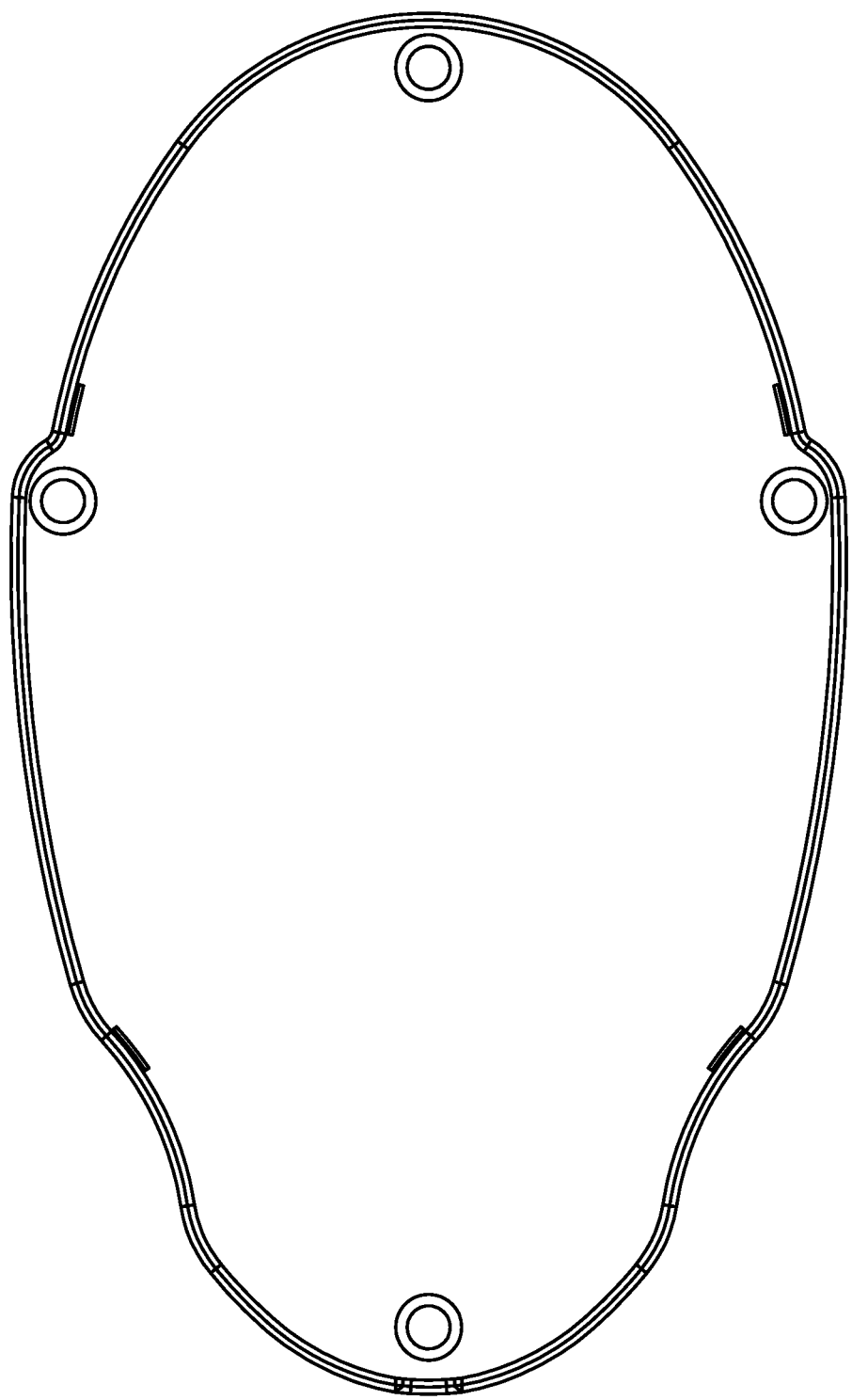
FIG. 9 is a bottom plan view of the beverage dispensing apparatus shown in FIG. 1.

The control assembly 70 as shown in FIG. 5 and with further reference to the other figures provides a linkage 112 coupled to a lever arm 114 at one end 116 and a control switch 118 at an opposite end 120. The lever arm 114 is operated by user depressing the protruding portion 80 which drives against the lever arm. Movement of the lever arm 114 connected to the linkage 112 at 116 causes operation of the control switch 118 coupled to the linkage 112 at end 120. The control assembly also connects the lever arm 114 to the keyed shaft 106 which is coupled to the valve 98. In this regard, while the lid 30 is opened the diverter pivots the stopper 102 to cover the dispensing passage 104. This would prevent water from flowing up through the dispensing passage 104 and upwardly through the outlet end 58 while the lid is open. Once the lid is closed, the keyed shaft 106 coupled to the lever arm 114 pivots to cover the exit passage 100 and allows water to flow through the dispensing passage 104 during the dispensing cycle.

The lid includes a snap fit closure 124 positioned generally opposite the hinge 36 to provide an interference fit to retain the lid 30 in a closed position. A variety of closures 124 can be devise for use with the present apparatus, system and method including any number of features. Such additional closure devices are incorporated in the present disclosure. Should a user open the lid 30 during a dispensing process the linkage with the valve 98 will cause the valve 98 to pivot and cover the dispensing passage thereby directing flow downwardly through the exit passage 100 into the cup 92. This will prevent the flow of water through the dispensing passage and through outlet and 58 if the lid 38 is opened during the dispensing cycle.

The present disclosure includes the method of producing a beverage using a dispenser which receives a container 42 containing beverage ingredient 94. The method includes delivering water from a water delivery system 52 through a single opening in the container 42. The beverage ingredient 94 is flushed from the cavity 84 and dispensed through the single opening into a container 42. This is different than other methods which use a pass-through system in which water enters the container 42 through a first opening and exits the container through a second opening. The apparatus, system, and method of the present disclosure eliminates the need for a second opening by introducing water and dispensing ingredient and water mixture through the same opening.

While a manually operated penetrating step is provided in the present disclosure, it is envisioned that an automatic penetrating step could be used. Regardless of the mechanism used to penetrate or otherwise provide an opening in the container, the use of a single opening by any mechanism is envisioned and should be broadly interpreted. Additionally, it may be preferable to provide an opening which severs or otherwise maintains the material which is opened intact. This would eliminate particles or pieces of the material which is opened from entering the beverage dispensing flow. In this regard, a container formed of a generally rigid, but perhaps flexible material could be used for the container body 96. The somewhat flexible material will allow some degree of flexibility and give when placing the holder 40. The end 82 covering the body 96 may give a flexible but suitably resilient sealing material such as multi-layer plastic often used with food products. Such food products might be commonly recognized as "creamer cups" which retain a volume of creamer product for use in mixing with coffee. The use of this type of container allows the end 82 to be penetrated providing an opening, but not allowing material to flow into the beverage stream.

It is envisioned that a container 42 could be configured of a material which is suitable to retain the beverage ingredient 94 but yet dissolves or becomes part of the fluid stream during the dispensing process. In this regard, the container 42 can be positioned in the holder 40 with the opening device 60 penetrating a portion of the container. As the water mixes with the ingredient the container material may degrade either because of contact with water or because of contact with heated water resulting in dissolving of the container material. As the container material dissolves the interior surface of the holder 40 is rinsed clean resulting in an empty holder 40 ready for use during the next cycle.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. A beverage dispensing apparatus including a container holder assembly, a water delivery system, and an opening device:
   the container holder assembly receiving and positioning a container in a downwardly facing orientation, retaining at least one ingredient, relative to the opening device;
   the water delivery system controllably delivering water to and through the apparatus for use in making a beverage to be dispensed from the apparatus;
   the opening device is coupled to and communicating with the water delivery system for controllably delivering water to the container;
   at least one of the container holder and the opening device being moveable to cause the opening device to form a single opening in the downwardly facing end of the container;
   the opening device is positioned in the apparatus for forming the single opening in the downwardly facing end of the container and controllably delivering water from the water delivery system into the container, flushing water through the container to dispense a mixture of the water and ingredient out of the container through the single, downwardly facing opening in the end of the container.

2. The beverage dispensing apparatus of claim 1, the container holder assembly further comprising:
   the container holder for removably receiving and retaining a container; and
   a retaining structure for retaining the container holder in a movable condition for displaceabley moving the container relative to the opening device.

3. The beverage dispensing apparatus of claim 1, the water delivery system further comprising a dispense tube communicating with a water source and the opening device for providing a path from the water source to the opening device.

4. The beverage dispensing apparatus of claim 3, the water delivery system further comprising a reservoir for receiving water therein, the dispense tube communicating with the reservoir and the opening device for providing a path from the reservoir to the opening device.

5. The beverage dispensing apparatus of claim 3, the water delivery system further comprising a heating system in thermal communicating with at least a portion of the dispense tube for controllably heating water in at least a portion of the water delivery system.

6. The beverage dispensing apparatus of claim 3, further comprising the opening device being removable from the apparatus.

7. The beverage dispensing apparatus of claim 1, the apparatus further comprising a housing having a lid displaceably retained thereon, the container holder assembly being carried on the lid for displaceably locating the container relative to the opening device.

8. The beverage dispensing apparatus of claim 7, the apparatus further comprising a diverter assembly communicating with the dispense tube and the opening device, the diverter assembly being operatively coupled to the lid such that displacement of the lid while water is flowing in the dispense tube will cause the diverter assembly to divert water away from the opening device.

9. A method for producing and dispensing a beverage using a container retaining at least one beverage ingredient:
   providing a water delivery system;
   providing an opening device communicating with the water delivery system;
   positioning a container proximate to the opening device with an end of the container oriented in a generally downwardly position;
   moving at least one of the container and opening device to engage the opening device with a downwardly facing end of the container;
   forming a single opening in the downwardly facing end of the container using the opening device;
   controllably delivering water from the water delivery system through the opening device for mixing with ingredient retained in the container; and
   flushing ingredient and water from the container through the single, downwardly facing opening in the end of the container.

* * * * *